United States Patent
Xu et al.

(10) Patent No.: US 11,763,164 B2
(45) Date of Patent: Sep. 19, 2023

(54) IMAGE-TO-IMAGE SEARCH METHOD, COMPUTER-READABLE STORAGE MEDIUM AND SERVER

(71) Applicant: BOE TECHNOLOGY GROUP CO., LTD., Beijing (CN)

(72) Inventors: Jingtao Xu, Beijing (CN); Jianwen Suo, Beijing (CN); Xiaojun Tang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 176 days.

(21) Appl. No.: 17/043,591

(22) PCT Filed: Dec. 20, 2019

(86) PCT No.: PCT/CN2019/127145
§ 371 (c)(1),
(2) Date: Sep. 29, 2020

(87) PCT Pub. No.: WO2020/155921
PCT Pub. Date: Aug. 6, 2020

(65) Prior Publication Data
US 2021/0026883 A1    Jan. 28, 2021

(30) Foreign Application Priority Data

Jan. 30, 2019 (CN) .......................... 201910093991.5

(51) Int. Cl.
*G06F 16/55* (2019.01)
*G06F 16/583* (2019.01)
*G06F 16/51* (2019.01)
(Continued)

(52) U.S. Cl.
CPC ............. *G06N 3/084* (2013.01); *G06F 16/51* (2019.01); *G06F 16/532* (2019.01); *G06F 16/55* (2019.01);
(Continued)

(58) Field of Classification Search
CPC ...... G06F 16/532; G06F 16/55; G06F 16/583; G06F 16/51
(Continued)

(56) References Cited

U.S. PATENT DOCUMENTS

2016/0004786 A1*  1/2016  Bosman .............. G06F 16/951
                                                        707/722
2016/0267637 A1*  9/2016  Hsiao ................. G06K 9/6271
(Continued)

FOREIGN PATENT DOCUMENTS

CN          1952935 A      4/2007
CN        101178773 A      5/2008
(Continued)

OTHER PUBLICATIONS

Office Action dated Jul. 24, 2020 in counterpart CN Patent Application No. 201910093991.5, 23 pages.
(Continued)

*Primary Examiner* — Kimberly L Wilson
(74) *Attorney, Agent, or Firm* — Procopio, Cory, Hargreaves & Savitch LLP

(57) ABSTRACT

An image-to-image search method which is implemented in a server is provided. The server receives an image to be searched and at least one category of similarity search sent by a terminal. The server extracts a feature code of the image by using a trained hash model that uniquely corresponds to the at least one category of similarity search according to the received image and the at least one category of similarity search. The server obtains target images that are similar to the image according to the feature code of the image in a feature code library that uniquely corresponds to the at least one category of similarity search. The server sends the target images to the terminal.

17 Claims, 4 Drawing Sheets

(51) Int. Cl.
  *G06F 16/532* (2019.01)
  *G06N 3/084* (2023.01)
  *G06N 3/08* (2023.01)
  *G06F 18/22* (2023.01)
  *G06V 10/74* (2022.01)

(52) U.S. Cl.
  CPC ............ *G06F 16/583* (2019.01); *G06F 18/22* (2023.01); *G06N 3/08* (2013.01); *G06V 10/761* (2022.01)

(58) Field of Classification Search
  USPC .......................................................... 707/740
  See application file for complete search history.

(56) References Cited

U.S. PATENT DOCUMENTS

| | | | | |
|---|---|---|---|---|
| 2016/0358043 | A1* | 12/2016 | Mu | ................ G06K 9/6217 |
| 2018/0152500 | A1 | 5/2018 | Park | |
| 2021/0026883 | A1 | 1/2021 | Xu et al. | |

FOREIGN PATENT DOCUMENTS

| | | |
|---|---|---|
| CN | 101710334 A | 5/2010 |
| CN | 102385578 A | 3/2012 |
| CN | 102902771 A | 1/2013 |
| CN | 103914463 A | 7/2014 |
| CN | 104281843 A | 1/2015 |
| CN | 105426529 A | 3/2016 |
| CN | 105512289 A | 4/2016 |
| CN | 106202362 A | 12/2016 |
| CN | 106407352 A | 2/2017 |
| CN | 107784310 A | 3/2018 |
| CN | 109241349 A | 1/2019 |
| CN | 109783671 A | 5/2019 |

OTHER PUBLICATIONS

Office Action dated Apr. 6, 2021 in counterpart CN Patent Application No. 201910093991.5, 19 pages.

* cited by examiner

IMAGE-TO-IMAGE SEARCH METHOD, COMPUTER-READABLE STORAGE MEDIUM AND SERVER

CROSS-REFERENCE TO RELATED APPLICATION

This application is a national phase entry under 35 USC 371 of international Patent Application No. PCT/CN2019/127145 filed on Dec. 20, 2019, which claims priority to Chinese Patent Application No. 201910093991.5, filed on Jan. 30, 2019, which are incorporated herein by reference in their entirety.

TECHNICAL FIELD

The present disclosure relates to the field of image processing technologies, and in particular, to an image-to-image search method, a computer-readable storage medium and a server.

BACKGROUND

As image data on the Internet becomes increasingly enormous, users demand a better image search experience, and an image-to-image search method has thus come into existence.

SUMMARY

In an aspect, an image-to-image search method is provided. The image-to-image search method includes: receiving an image to be searched and at least one category of similarity search sent by a terminal; extracting a feature code of the image to be searched by using a trained hash model that uniquely corresponds to the at least one category of similarity search according to the received image to be searched and the at least one category of similarity search; obtaining target images that are similar to the image to be searched according to the feature code of the image to be searched in a feature code library that uniquely corresponds to the at least one category of similarity search; and sending the target images to the terminal.

In some embodiments, the method further includes: receiving a push request sent by the terminal, the push request instructing to send an image that a user is interested in to an image screen, and the image that the user is interested in being one or more of the target images; and sending the image that the user is interested in to the image screen, so that the image screen displays the image that the user is interested in.

In some embodiments, obtaining the target images that are similar to the image to be searched according to the feature code of the image in the feature code library that uniquely corresponds to the at least one category of similarity search includes: calculating a distance between the feature code of the image and each feature code in the feature code library according to the feature code of the image in the feature code library that uniquely corresponds to the at least one category of similarity search; and obtaining a feature code in the feature code library with a smallest distance to the feature code of the image, and obtaining the target images that correspond to the feature code in the feature code library.

In some embodiments, obtaining the feature code in the feature code library with the smallest distance to the feature code of the image to be searched includes: comparing the distance between the feature code of the image and each feature code in the feature code library with a distance threshold to obtain feature codes in the feature code library with distances less than the distance threshold; and sorting the feature codes in the feature code library with distances less than the distance threshold by magnitudes of the distances to obtain the feature code in the feature code library with the smallest distance to the feature code of the image.

In some embodiments, the hash model includes one-dimensional hash models, and each one-dimensional hash model uniquely corresponds to one category of similarity search; and the image-to-image search method further includes obtaining the one-dimensional hash models through training with images with known tags.

In some embodiments, the hash model further includes multi-dimensional hash models, and each multi-dimensional hash model uniquely corresponds to at least two categories of similarity search; the image-to-image search method further includes obtaining the multi-dimensional hash models through training.

In some embodiments, obtaining the multi-dimensional hash models through training includes:
establishing a training data set, the training data set including an image subset and at least two tag subsets, the at least two tag subsets being in one-to-one correspondence with the at least two categories of similarity search, tags in each tag subset being obtained based on a category of similarity search that corresponds to the tag subset, the image subset including a plurality of images, and each tag subset including tags that are in one-to-one correspondence with images in the image subset; and
obtaining the multi-dimensional hash models through training with the training data set.

In some embodiments, the tags in each tag subset are obtained based on a one-dimensional hash model that corresponds to one category of similarity search that corresponds to the tag subset.

In some embodiments, obtaining the multi-dimensional hash models through training with the training data set includes: dividing the images in the image subset into a plurality of image pairs; for each image pair, determining whether tags corresponding to the image pair in each tag subset are the same or not, determining that the image pair is a positive sample if the tags corresponding to the image pair in each tag subset are the same, and determining that the image pair is a negative sample if the tags corresponding to the image pair are not the same; and inputting the positive sample and negative sample to a convolutional neural network for training to obtain the multi-dimensional hash models.

In some embodiments, in a case where any category of similarity search includes a plurality of sub-categories, a number of images in the image subset with features of respective sub-categories under the category of similarity search is configured according to proportions of the sub-categories.

In some embodiments, the method further includes: establishing a feature code library that uniquely corresponds to the at least one category of similarity search.

In some embodiments, establishing a feature code library that uniquely corresponds to the at least one category of similarity search includes: inputting images in an image library to the trained hash model that uniquely corresponds to the at least one category of similarity search to obtain feature codes of the images; and obtaining the feature code library that uniquely corresponds to the at least one category of similarity search according to the obtained feature codes.

In another aspect, a computer-readable storage medium is provided. The computer-readable storage medium has stored therein computer program instructions that, when executed on a processor, cause the processor to perform one or more steps of the image-to-image search method provided by any one of above embodiments.

In yet another aspect, a computer program product is provided. The computer program product includes computer program instructions that, when executed on a computer, cause the computer to perform one or more steps of the image-to-image search method provided by any one of above embodiments.

In yet another aspect, a computer program is provided. When executed on a computer, the computer program causes the computer to perform one or more steps of the image-to-image search method provided by any one of above embodiments.

In yet another aspect, a server is provided. The server includes a processor and a memory. The memory stores one or more programs. When the one or more programs stored in the memory are executed by the processor, one or more steps of the image-to-image search method described above are implemented.

BRIEF DESCRIPTION OF THE DRAWINGS

In order to describe technical solutions in the present disclosure more clearly, accompanying drawings to be used in some embodiments of the present disclosure will be introduced briefly. Obviously, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, and are not limitations on actual sizes of products, actual processes of methods and actual timings of signals to which the embodiments of the present disclosure relate.

DETAILED DESCRIPTION

Technical solutions in some embodiments of the present disclosure will be described clearly and completely in combination with accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, the term "comprise" and other forms thereof such as the third-person singular form "comprises" and the present participle form "comprising" in the description and the claims are construed as open and inclusive, i.e., "including, but not limited to". In the description of the specification, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, specific features, structures, materials or characteristics may be included in any one or more embodiments or examples in any suitable manner.

In the related art, an image-to-image search method is a searching technology in which same or similar images can be searched by inputting an image. However, there are many problems in the related art, such as slow searching speed and great errors in searching results.

Figure 1:
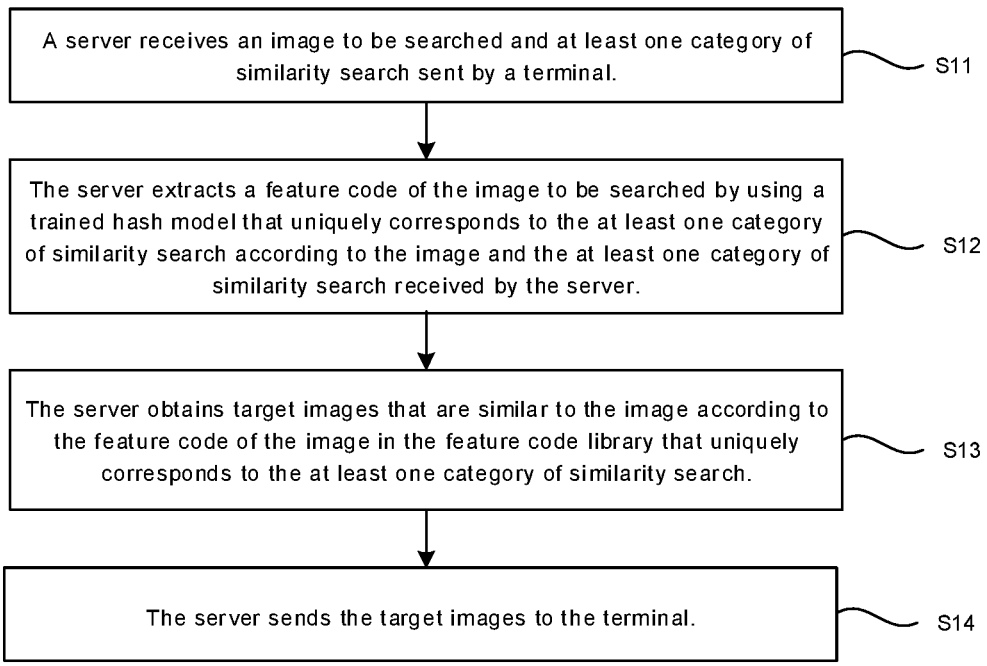
FIG. 1 is a flow diagram of an image-to-image search method, in accordance with some embodiments of the present disclosure.

On this basis, some embodiments of the present disclosure provide an image-to-image search method. As shown in FIG. 1, the method includes S11 to S14.

In S11, a server receives an image to be searched and at least one category of similarity search sent by a terminal.

An entire system for image-to-image search method at least includes a terminal and a server. For example, a user uses a terminal to take a picture and uploads the image to the server, or uploads an image from the terminal's album to the server. In addition, at least one category of similarity search may also be uploaded to the server through the terminal.

Each category of similarity search is the basis for dividing images. For example, if images are divided according to content, a corresponding category of similarity search is the content; if the images are divided according to subject, the corresponding category of similarity search is the subject; if the images are divided according to style, the corresponding category of similarity search is the style.

For example, the category of similarity search may be selected by the user on an application (APP) of the terminal. That is to say, the APP provides a plurality of categories of similarity search for the user, and the user selects one or more categories.

For example, choices of categories of similarity search on the terminal may include content, subject, style, and other categories. In a case where the user selects one category, the category selected by the user and the image to be searched will be uploaded to the server, in a case where the user selects two categories, the two categories selected by the user and the image to be searched will be uploaded to the server. Of course, the user may also select three categories. In this case, the three categories selected by the user and the image to be searched will be uploaded to the server. Herein, the number of categories that the user may select is not limited, and the user may select the categories according to the number of categories covered by the image that needs to be obtained.

For example, the terminal may be a mobile phone, a tablet computer, a PC (Personal Computer), a notebook computer, and the like, which is not limited in this embodiment.

In S12, the server extracts a feature code of the image to be searched by using a trained hash model that uniquely corresponds to the at least one category of similarity search according to the image and the at least one category of similarity search received by the server.

In a case where there is only one category of similarity search, the category of similarity search uniquely corresponds to a trained hash model (which may be called a one-dimensional hash model). In a case where there are at least two categories of similarity search, each of combinations of at least two categories of similarity search also uniquely corresponds to a trained hash model (which may be called a multi-dimensional hash model). On this basis, those skilled in the art will understand that the hash model is different when the category of similarity search is different.

The number of hash models that have been trained is determined by the categories of similarity search provided for the user to select from. For example, in a case where there are N categories of similarity search available for users to select from, each category of similarity search uniquely corresponds to a one-dimensional hash model, and each of combinations of two categories of similarity search uniquely corresponds to a trained two-dimensional hash model, each of combinations of three categories of similarity search uniquely corresponds to a trained three-dimensional hash model, and so forth, until N categories of similarity search uniquely correspond to a trained N-dimensional hash model.

For example, if the server receives an image to be searched and a category of similarity search, and the category is content, then the one-dimensional hash model that uniquely corresponds to the content category is used to extract the feature code of the image. If the server receives the image to be searched and two categories of similarity search, and the two categories are content and subject, then a two-dimensional hash model that uniquely corresponds to the content and subject categories is used to extract the feature code of the image. If the server receives the image to be searched and two categories of similarity search, and the two categories are content and style, then a two-dimensional hash model that uniquely corresponds to the content and style categories is used to extract the feature code of the image. If the server receives the image to be searched and three categories of similarity search, and the three categories are content, subject and style, then a three-dimensional hash model that uniquely corresponds to the content, subject and style categories is used to extract the feature code of the image.

The feature code of the image extracted by the hash model is binary data.

A length of the feature code may be set to 12 bit, 24 bit, 48 bit, 64 bit, etc. according to complexity of the categories. For example, in a case where the category of similarity search is content, since the content category is easy to identify, the feature code that corresponds to the content category may be set to 12 bit. In a case where the category of similarity search includes style, since the style category is difficult to identify, in order to retain more information, the feature codes that correspond to the style category may be set to 24 bit.

The server is able to extract the feature code of the image, and the feature code of the image is used to facilitate subsequent retrieval.

In S13, the server obtains target images that are similar to the image according to the feature code of the image in a feature code library that uniquely corresponds to the at least one category of similarity search.

In a case where there is only one category of similarity search, the category of similarity search uniquely corresponds to one feature code library. In a case where there are at least two categories of similarity search, each of combinations of at least two categories of similarity search also uniquely corresponds to one feature code library. On this basis, those skilled in the art will understand that the feature code library is different when the category of similarity search is different.

The number of the feature code libraries is determined by the categories of similarity search that are provided for the user to select from. For example, in the case where there are N categories of similarity search for the user to select from, then each category of similarity search uniquely corresponds to one feature code library, each of combinations of two categories of similarity search uniquely corresponds to one feature code library, each of combinations of three categories of similarity search uniquely corresponds to a feature code library, and so forth, until N categories of similarity search uniquely correspond to one feature code library.

It will be noted that the hash model is in one-to-one correspondence with the feature code library.

The feature code library has feature codes of each image in an image library.

In the feature code library that uniquely corresponds to the at least one category of similarity search, the server traverses the feature codes in the feature code library to compare each feature code in the feature code library with the feature code of the image to be searched one by one. According to comparison results, the feature code that is the most similar or identical to the feature code of the image may be obtained, and then the target images are obtained from the image library according to image name and address associated with the obtained feature code.

In S14, the server sends the target images to the terminal.

As mentioned above, in the image-to-image search method provided in this embodiment, the feature code of the image to be searched may be extracted through the server by using the trained hash model that uniquely corresponds to at least one category of similarity search according to the image and the at least one category of similarity search. Further, the target images that are similar to the image may be obtained through the server according to the feature code of the image in the feature code library that corresponds to the at least one category of similarity search, and then sent to the terminal. It will be noted that, in this embodiment, the server is able to quickly locate the feature code library that corresponds to the at least one category of similarity search according to the at least one category of similarity search, and then perform the search in the feature code library. Compared with non-targeted ergodic search in the related art, the image- to-image search method provided in this embodiment is closer to users' expectations and improves retrieval effect while ensuring a matching accuracy.

Optionally, the image-to-image search method further includes establishing the feature code library that uniquely corresponds to the at least one category of similarity search.

Figure 2:
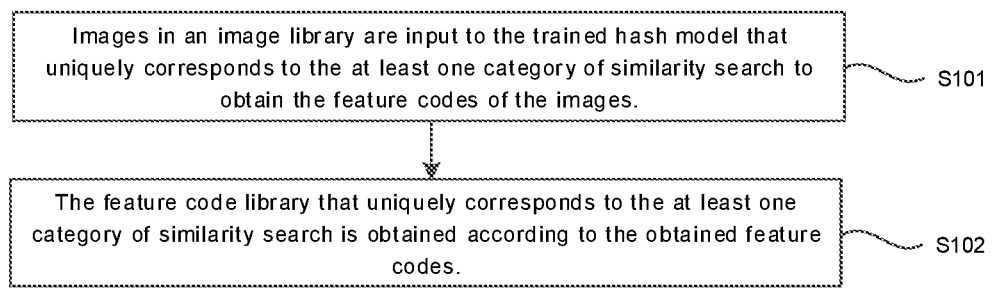
FIG. 2 is a flow diagram of another image-to-image search method, in accordance with some embodiments of the present disclosure.

As shown in FIG. 2, a step of establishing the feature code library that uniquely corresponds to the at least one category of similarity search includes S101 and S102.

In S101, images in an image library are input to the trained hash model that uniquely corresponds to the at least one category of similarity search to obtain the feature codes of the images.

It will be understood that for images in the same image library, different feature codes can be generated using different hash models.

In S102, the feature code library that uniquely corresponds to the at least one category of similarity search is obtained according to the obtained feature codes.

In this embodiment, the server is able to extract the feature code of each image in the image library by using the hash model that uniquely corresponds to the at least one category of similarity search, so as to generate the feature code library that corresponds to the at least one category of similarity search.

For example, in the case where there is only one category of similarity search and the category is content, the server extracts feature codes of each image in the image library by using the one-dimensional hash model that corresponds to the content category to generate the corresponding feature code library that corresponds to the content category. In the case where there are two categories of similarity search, and the two categories are content and subject, the server extracts the feature codes of each image in the image library by using the two-dimensional hash model that uniquely corresponds to the content and subject categories to generate a feature code library that corresponds to the content and subject categories. In the case where there are two categories of similarity search, and the two categories are content and style, the server extracts the feature codes of each image in the image library by using the two-dimensional hash model that uniquely corresponds to the content and style categories to generate a feature code library that corresponds to the content and style categories. In the case where there are three categories of similarity search, and the three categories are content, subject and style, the server extracts the feature codes of each image in the image library by using the three-dimensional hash model that uniquely corresponds to the content, subject and style categories to generate a feature code library that corresponds to the content, subject and style categories.

In some embodiments, an entire system of image-to-image search may further include an image screen.

Figure 3:
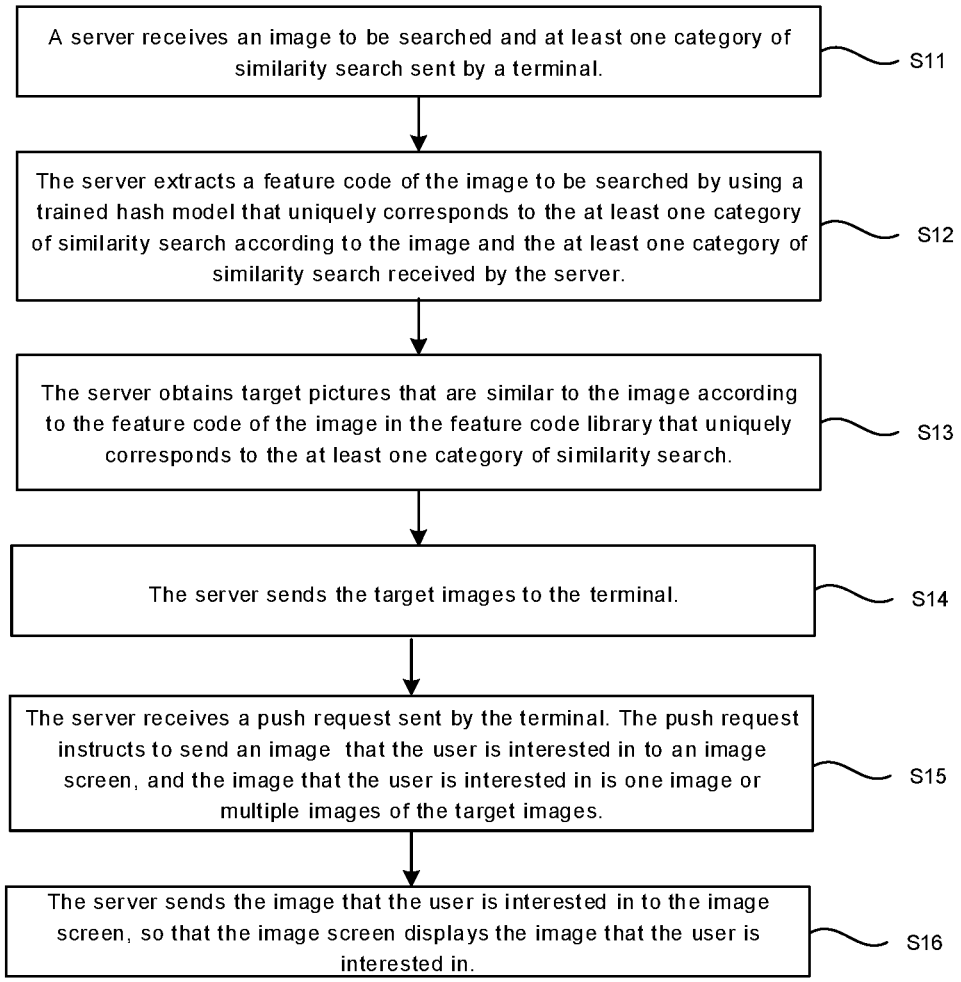
FIG. 3 is a flow diagram of yet another image-to-image search method, in accordance with some embodiments of the present disclosure.

On this basis, optionally, as shown in FIG. 3, after S14, the image-to-image search method further includes S15 and S16.

In S15, the server receives a push request sent by the terminal. The push request instructs to send an image that the user is interested in to the image screen, and the image that the user is interested in is one image or multiple images of the target images.

In S16, the server sends the image that the user is interested into the image screen, so that the image screen displays the image that the user is interested in.

In this example, the user may directly select one image or multiple images of the target images as the image(s) that the user is interested in on the terminal, and the selected image(s) that the user is interested in may be displayed on the image screen, which is more convenient and faster.

Figure 4:
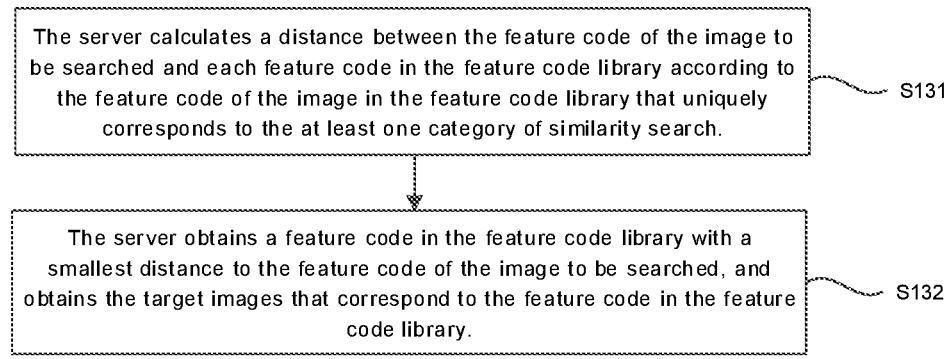
FIG. 4 is a flow diagram of yet another image-to-image search method, in accordance with some embodiments of the present disclosure.

In some embodiments, as shown in FIG. 4, a step of S13 in which the server obtains the target images that are similar to the image according to the feature code of the image in the feature code library that uniquely corresponds to the at least one category of similarity search includes S131 and S132.

In S131, the server calculates a distance between the feature code of the image to be searched and each feature code in the feature code library according to the feature code of the image in the feature code library that uniquely corresponds to the at least one category of similarity search.

A distance between the feature code of the image and each feature code in the feature code library may be calculated by a method of Hamming Distance. The server determines whether each bit of a feature code in the feature code library is the same as that of the feature code of the image to be searched by comparing each feature code in the feature code library with the feature code of the image, and the Hamming Distance between the two feature codes is incremented by 1 for every difference in one bit.

For example, the feature code of the image is 10001001, and a feature code in the feature code library is 10110001, so 3 bits (a third bit, a fourth bit and a fifth bit from the left) are different, then the Hamming Distance between the two feature codes is 3.

In S132, the server obtains a feature code in the feature code library with a smallest distance to the feature code of the image to be searched, and obtains the target images that correspond to the feature code in the feature code library.

The server sorts the feature codes in the feature code library in an increasing or a decreasing order of distances according to calculated distances between the feature code of the image and feature codes in the feature code library, and outputs corresponding image names and addresses according to a sorted list. The further a feature code in the feature code library is from the feature code of the image to be searched, the more different the corresponding image is from the image; and the closer the feature code in the feature code library is to the feature code of the image, the more similar the corresponding image is to the image.

Figure 5:
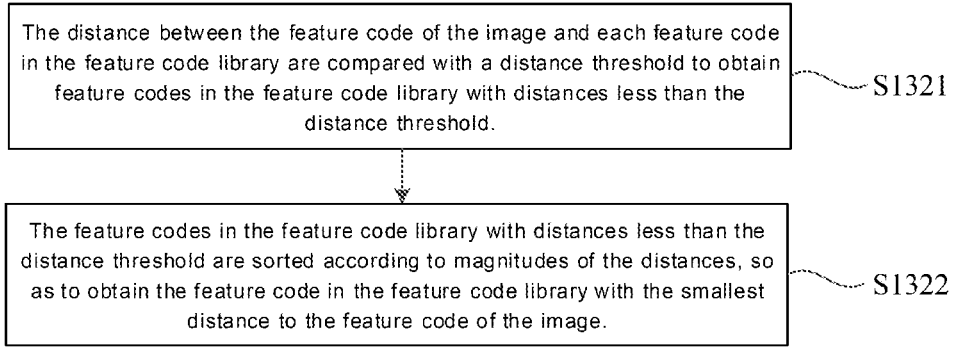
FIG. 5 is a flow diagram of yet another image-to-image search method, in accordance with some embodiments of the present disclosure.

For example, a distance threshold may be set before the feature codes in the feature code library are sorted according to the distances. In this case, as shown in FIG. 5, S132 may include S1321 and S1322.

In S1321, the distance between the feature code of the image and each feature code in the feature code library are compared with a distance threshold to obtain feature codes in the feature code library with distances less than the distance threshold. For example, feature codes in the feature code library with distances greater than or equal to the distance threshold are deleted. The feature codes with distances greater than or equal to the distance threshold are deleted first, that is, a majority of the feature codes that have low similarity to the feature code of the image are deleted first.

In S1322, the feature codes in the feature code library with distances less than the distance threshold are sorted according to magnitudes of the distances, so as to obtain the feature code in the feature code library with the smallest distance to the feature code of the image. In this way, a workload of subsequent sorting may be reduced, and a search efficiency may be improved.

A value of the distance threshold may be set as required, and it is not limited in this embodiment.

It will be understood that one or more target images may be obtained after S132. In a case where there are multiple target images, it means that the feature codes of these target images have the same distances to the feature code of the image.

On this basis, optionally, the image-to-image search method further includes obtaining the one-dimensional hash models through training with images with known tags. It will be understood that each one-dimensional hash model uniquely corresponds to one category of similarity search.

Example 1: image pairs formed by images with known content tags are input to a convolutional neural network, and it is determined where content tags that correspond to the images pairs are the same based on the convolutional neural network; if the tags are the same, a determination result is output to be 0, which indicates that image pairs are similar; if the tags are not the same, the determination result is output to be 1, which indicates that image pairs are not similar. In this way, a content hash model can be trained.

Example 2: image pairs formed by images with known subject tags are input to the convolutional neural network, and it is determined whether subject tags that correspond to the images pairs are the same based on the convolutional neural network; if the tags are the same, the determination result is output to be 0, which indicates that image pairs are similar; if the tags are not the same, the determination result is output to be 1, which indicates that image pairs are not similar. In this way, a subject hash model can be trained.

Example 3, image pairs formed by images with known style tags are input to the convolutional neural network, and it is determined whether style tags that correspond to the images pairs are the same based on the convolutional neural network; if the tags are the same, the determination result is output to be 0, which indicates that image pairs are similar; if the tags are not the same, the determination result is output to be 1, which indicates that image pairs are not similar. In this way, a style hash model can be trained.

An image pair may include two images, which are subsequently compared with each other to determine whether the two images have the same tag.

On this basis, optionally, the image-to-image search method further includes obtaining the multi-dimensional hash models by training. It will be understood that each multi-dimensional hash model uniquely corresponds to at least two categories of similarity search.

Figure 6:
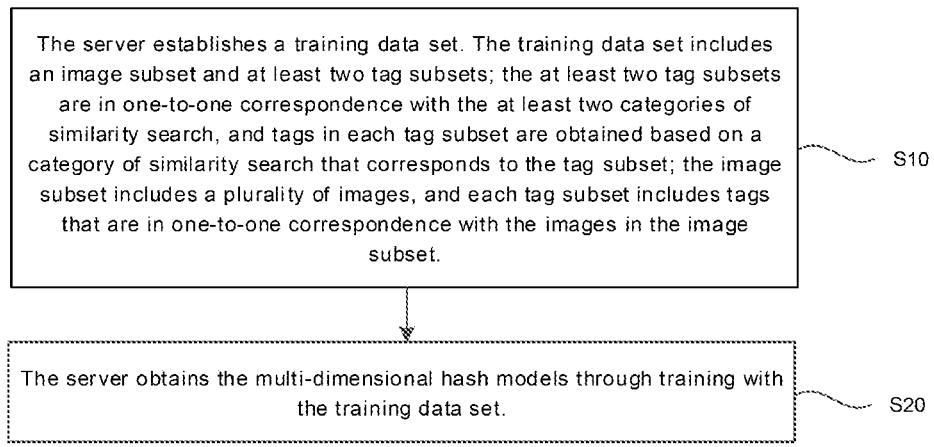
FIG. 6 is a flow diagram of yet another image-to-image search method, in accordance with some embodiments of the present disclosure.

For example, as shown in FIG. 6, a step of obtaining the multi-dimensional hash models through training includes S10 and S20.

In S10, the server establishes a training data set. The training data set includes an image subset and at least two tag subsets; the at least two tag subsets are in one-to-one correspondence with the at least two categories of similarity search, and tags in each tag subset are obtained based on a category of similarity search that corresponds to the tag subset; the image subset includes a plurality of images, and each tag subset includes tags that are in one-to-one correspondence with the images in the image subset.

It will be understood that the number of tag subsets is the same as the number of at least two categories of similarity search. That is, in the case where there are two categories of similarity search, the number of tag subsets is also two, and the two tag subsets are in one-to-one correspondence with the two categories of similarity search. In the case where there are three categories of similarity search, the number of tag subsets is also three, and the three tag subsets are in one-to-one correspondence with the three categories of similarity search.

In a case where there is only one image subset, each tag subset corresponds to the image subset.

For each tag subset, taking a tag subset that corresponds to a content category as an example, the tag subset includes content tags of each image in the image subset. Taking a tag subset that corresponds to a subject category as an example, the tag subset includes subject tags of each image in the image subset. Taking a tag subset that corresponds to a style category as an example, the tag subset includes style tags of each image in the image subset.

Optionally, the tags in each tag subset are obtained based on the one-dimensional hash model that corresponds to a category of similarity search that corresponds to the tag subset.

For example, the tag subsets that correspond to the content category may be obtained based on the trained one-dimensional hash model that corresponds to the content category, the tag subsets that correspond to the subject category may be obtained based on the trained one-dimensional hash model that corresponds to the subject category, and the tag subsets that correspond to the style category may be obtained based on the trained one-dimensional hash model that corresponds to the style category.

In S20, the server obtains the multi-dimensional hash models through training with the training data set.

For example, in the case where the at least two categories of similarity search are content and subject, the server is able to obtain a unique hash model that corresponds to the content and subject categories according to the training data set. In the case where the at least two categories of similarity search are content, subject and style, the server is able to obtain a unique hash model that corresponds to the content, subject and style categories according to the training data set.

Optionally, in a case where any category of similarity search includes a plurality of sub-categories, the number of the images in the image subset with features of respective sub-categories in the category of similarity search is configured according to proportions of the sub-categories.

A sub-category is a specific category under the category of similarity search. For example, a content category may include sub-categories such as people, flowers, birds, fish and insects; a subject category may include sub-categories such as animal paintings, landscape paintings, religious paintings and genre paintings; a style category may include sub-categories such as realism, impressionism, cubism and hyperrealism.

In a case where each category of similarity search includes a plurality of sub-categories, in the training process of the hash model, the difficulty varies for identifying a sub-category of images with features of the category of similarity search based on the convolutional neural network, which leads to a large difference in amount of data. Therefore, based on historical experience, in a case where each category of similarity search includes a plurality of sub-categories, a certain proportion may be set for these sub-categories. For example, in the style category, since hyperrealism is easy to identify, the proportion is set to be lower; and since impressionism is hard to identify, the proportion is set to be higher. By configuring the images in the image subset with features of respective sub-categories under the category of similarity search according to the proportions of the sub-categories, data proportion in the hash model training may be more balanced, and a recognition effect of the trained hash model is also better.

For example, there are 1000 flower images with different styles. 800 of the images are of hyperrealist style and 200 of the images are of impressionist style. Since hyperrealist flowers are easier to identify than impressionist flowers, a certain proportion is set based on historical experience. For example, if a proportion of hyperrealist flowers to impressionist flowers is set to 1:1, then 200 hyperrealist flowers and 200 impressionist flowers may be selected to create an image subset for training.

Figure 7:
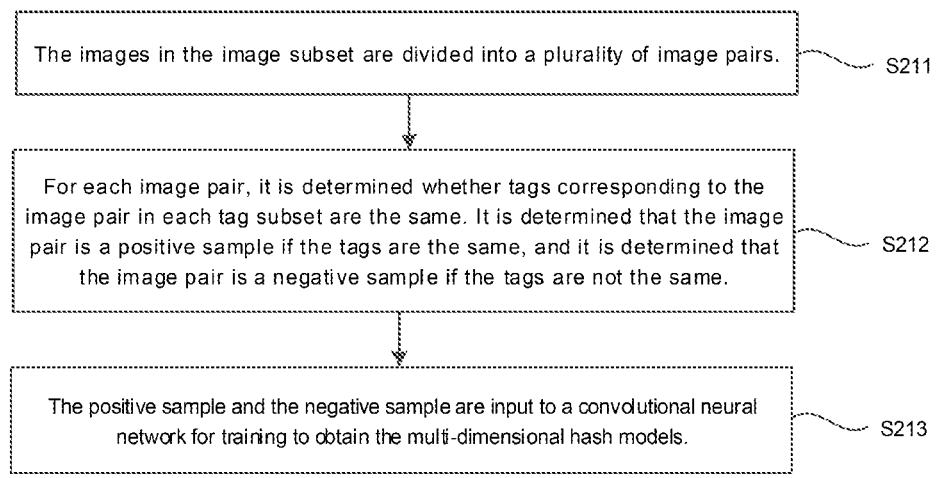
FIG. 7 is a flow diagram of yet another image-to-image search method, in accordance with some embodiments of the present disclosure.

Optionally, as shown in FIG. 7, in S20, obtaining the multi-dimensional hash models through training with the training data set includes S211 to S213.

In S211, the images in the image subset are divided into a plurality of image pairs.

The image pairs are subsequently compared with each other to determine whether the two images have the same tag.

In S212, for each image pair, it is determined whether tags corresponding to the image pair in each tag subset are the same. It is determined that the image pair is a positive sample if the tags are the same, and it is determined that the image pair is a negative sample if the tags are not the same.

For example, in a case where the at least two categories of similarity search are content and subject categories, with a determining order of from content to subject, it is determined whether tags of each image pair in a tag subset that corresponds to the content are the same based on the convolutional neural network. If the content tags of an image pair are the same, the image pair is determined to be a first-level positive sample. On the basis of being the first-level positive sample, then it is determined whether the tags of the image pair in a tag subset that corresponds to the subject are the same. If the subject tags of the image pair are the same, the image pair is determined to be a second-level positive sample. The second-level positive samples are regarded as positive samples, and all other samples are regarded as negative samples.

For example, in a case where the at least three categories of similarity search are content, subject and style, with a determining order of from content, subject to style, it is determined whether the tags of each image pair in a tag subset that corresponds to the content are the same based on the convolutional neural network. If the content tags of the image pair are the same, then the image pair is determined to be a first-level positive sample. On the basis of being the first-level positive sample, it is determined whether the tags of the image pair in the tag subset that corresponds to the subject are the same. If the subject tags of the image pair are also the same, the image pair is determined to be a second-level positive sample. On the basis of being the second-level positive sample, it is determined whether the tags of the image pair in the tag subset that corresponds to the style are the same. If the style tags of the image pair are also the same, the image pair is determined to be as a third-level positive sample. The third-level positive samples are regarded as positive samples, and all other samples are regarded as negative samples.

If there are N categories of similarity search, tags of each image in an image pair that correspond to N categories needs to be the same for the image pair to be regarded as a positive sample. Otherwise, the image pair is regarded as a negative sample.

In S213, the positive sample and the negative sample are input to a convolutional neural network for training to obtain the multi-dimensional hash models.

Image pairs of the positive samples are input to the convolutional neural network, and the determination result based on the convolutional neural network is 0, which indicates that the image pair is similar. Image pairs of the negative samples are input to the convolutional neural network, and the determination result based on the convolutional neural network is 1, which indicates that the image pair is not similar. In this way, a multi-dimensional hash model that uniquely corresponds to the at least two categories of similarity search is obtained through repeated trainings.

Based the above, it is possible to obtain a hash model that corresponds to all combinations of the categories provided for the user to select from through training. That is, no matter what category the user selects or how many categories the user selects at the same time when uploading the image to be searched, the server is able to call a corresponding trained hash model, and obtain the feature code of the image to be searched by using the corresponding hash model.

On this basis, if the determination result output by the convolutional neural network is between 0 and 1 in a training process of the hash model, an error between an actual result and an expected result needs to be calculated to perform back adjustment on parameters of the convolutional neural network, so as to compensate for the error and output correct results.

On this basis, adjustments may be made through the following process.

The following formula $$L_r(b_1,b_2,y)=\tfrac{1}{2}(1-y)\|b_1-b_2\|_2^2+\tfrac{1}{2}y\times \max(m-\|b_1-b_2\|_2^2,0)+\alpha(\|\,|b_1|-1\|_1+\|\,|b_2|-1\|_1) \quad \text{Formula (1)},$$

in which $b_j \in \{+1,-1\}^k$, $j \in \{1,2\}$, is used to calculate a loss function $L_r$ of the positive samples or the negative samples.

Then the parameters of the convolutional neural network can be adjusted based on the loss function through back propagation to compensate the error and thus make the output results more accurate.

In a case where the input image pair is $I_1$ and $I_2$, the corresponding hash codes are $b_1$ and $b_2$, which are a k-dimensional $\{-1, +1\}$ vector. If two images are similar, then y=0, otherwise y=1. m>0, and is an edge threshold parameter. Q is a weighted parameter that controls intensity of regularization.

$\tfrac{1}{2}(1-y)\|b_1-b_2\|_2^2$ is a Euclidean distance when y=0, i.e., when the two images are similar. $\tfrac{1}{2}y\times\max(m-\|b_1-b_2\|_2^2,0)$ is the Euclidean distance when y=1, i.e., when the two images are not similar. the third term $\alpha(\|\,|b_1|-1\|_1+\|\,|b_2|-1\|_1)$ is a regularization term for optimizing results.

On this basis, since an actual result of judging whether an image pair is similar may only infinitely approach 0 or 1 but cannot be equal to 0 or 1 in the training process of a hash model, there is always a certain error. Therefore, an overall loss function needs to be calculated to adjust the parameters, so that the hash model is more accurate in obtaining the feature code of the image.

Therefore, the following formula $$L_r = \sum_{i=1}^{N} L_r(b_{i,1}, b_{i,2}, y_i), \quad \text{(Formula 2)}$$

is used to calculate the loss function L of all image pairs.

By substituting Formula (1) into Formula (2), and it is obtained that:

$$L_r = \sum_{i=1}^{N}\Big\{\tfrac{1}{2}(1-y_i)\|b_{i,1}-b_{i,2}\|_2^2 + \tfrac{1}{2}y_i\max\!\left(m-\|b_{i,1}-b_{i,2}\|_2^2,\,0\right) + \alpha(\|\,|b_{i,1}|-1\|_1 + \|\,|b_{i,2}|-1\|_1)\Big\}.$$

For the above formula, $b_{i,j} \in \{+1,-1\}^k$, $i \in \{1, 2 \ldots, N\}$, $j \in \{1,2\}$. When there are N pairs of input images, two images in each image pair are $b_{i,1}$ and $b_{i,2}$, which are k-dimensional $\{-1, +1\}$ vectors. If the two images are similar, then $y_i=0$, otherwise $y_i=1$. m>0, and is the edge threshold parameter. $\alpha$ is a weighted parameter that controls the intensity of regularization.

The parameters of the convolutional neural network can be adjusted based on the loss function through back propagation to compensate the error and thus make the output results more accurate.

A derivative used for back propagation is:

$$\frac{\partial \text{Term1}}{\partial b_{i,j}} = (-1)^{j+1}(1-y_i)(b_{i,1}-b_{i,2});$$

$$\frac{\partial \text{Term2}}{\partial b_{i,j}} = \begin{cases} (-1)^{j+1}y_i(b_{i,1}-b_{i,2}), & \|b_{i,1}-b_{i,2}\|_2^2 < m \\ 0, & \text{otherwise} \end{cases};$$

$$\frac{\partial \text{Regularizer}}{\partial b_{i,j}} = \alpha\delta(b_{i,j});$$

herein, $$\delta(\chi) = \begin{cases} 1, & -1 \le \chi \le 0 \text{ or } \chi \ge 1 \\ -1, & \text{otherwise} \end{cases}.$$

It will be noted that Term1, Term2, and Regularizer are:

Term1=½(1−$y_i$)$\|b_{i,1}-b_{i,2}\|_2^2$;

Term2=½$y_i$ max($m-\|b_{i,1}-b_{i,2}\|_2^2$,0)

Regularizer=$\alpha(\|b_{i,1}|-1\|_1+\|b_{i,2}|-1\|_1)$.

$\delta(b_{i,j})$ is a derivation result for $(\||b_{i,1}|-\|_1+\||b_{i,2}|-\|_1)$, which is $$\delta(\chi) = \begin{cases} 1, & -1 \le \chi \le 0 \text{ or } \chi \ge 1 \\ -1, & \text{otherwise} \end{cases}.$$

Some embodiments of the present disclosure further provide a computer-readable storage medium (e.g. a non-transitory computer-readable storage medium). The computer-readable storage medium has stored therein computer program instructions that, when executed on a processor, cause the processor to perform one or more steps of the image-to-image search method provided in any one of above embodiments.

For example, the computer-readable storage medium may include, but is not limited to: a magnetic storage device (e.g., a hard disk, a floppy disk, or a magnetic tape, etc.), an optical disk (e.g., a compact disk (CD), a digital versatile disk (DVD), etc.), a smart card or a flash memory device (e.g., an erasable programmable read-only memory (EPROM), a card, a stick or a key drive, etc.). The various computer-readable storage media described in the present disclosure may represent one or more devices and/or other machine-readable storage media for storing information. The term "machine-readable storage media" may include, but are not limited to, various other media capable of storing, containing, and/or carrying instructions and/or data.

Some embodiments of the present disclosure further provide a computer program product. The computer program product includes computer program instructions that, when executed on a computer, cause the computer to execute one or more steps of the image-to-image search method provided by above embodiments.

Some embodiments of the present disclosure further provide a computer program. When executed on the computer, the computer program causes the computer to execute one or more steps of the image-to-image search method provided by above embodiments.

Figure 8:
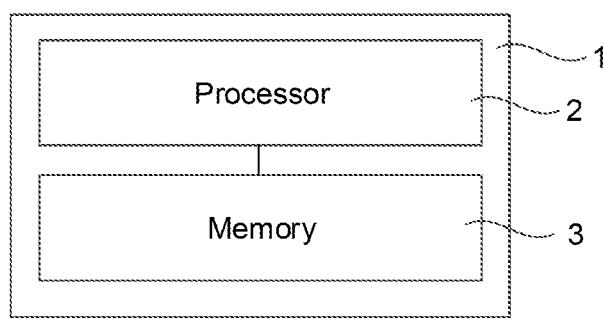
FIG. 8 is a schematic diagram of a server for an image-to-image search method, in accordance with some embodiments of the present disclosure.

Some embodiments of the present disclosure further provide a server 1. As shown in FIG. 8, the server 1 includes a processor 2 and a memory 3. The memory 3 stores one or more programs.

When the one or more programs stored in the memory 3 are executed by the processor 2, one or more steps of the image-to-image search method described above are implemented.

The computer-readable storage medium, the computer program product and the computer program have the same beneficial effects as the image-to-image search method as described in the above embodiments, and details will not be repeated here.

The forgoing descriptions are merely specific implementations of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. An image-to-image search method, comprising:
   receiving an image to be searched and at least one category of similarity search sent by a terminal, wherein the at least one category of similarity search is selected by a user at the terminal;
   extracting a feature code of the image by using a trained hash model that uniquely corresponds to the at least one category of similarity search according to the received image and the at least one category of similarity search;
   obtaining target images that are similar to the image according to the feature code of the image in a feature code library that uniquely corresponds to the at least one category of similarity search; and
   sending the target images to the terminal,
   wherein the hash model includes multi-dimensional hash models, and each multi-dimensional hash model uniquely corresponds to at least two categories of similarity search; and
   wherein the image-to-image search method further comprises obtaining the multi-dimensional hash models through training.

2. The image-to-image search method according to claim 1, further comprising:
   receiving a push request sent by the terminal, the push request instructing to send an image that a user is interested into an image screen, and the image that the user is interested in being one or more of the target images; and
   sending the image that the user is interested into the image screen, so that the image screen displays the image that the user is interested in.

3. The image-to-image search method according to claim 1, wherein obtaining the target images that are similar to the image to be searched according to the feature code of the image in the feature code library that uniquely corresponds to the at least one category of similarity search includes:
   calculating a distance between the feature code of the image and each feature code in the feature code library according to the feature code of the image in the feature code library that uniquely corresponds to the at least one category of similarity search; and
   obtaining a feature code in the feature code library with a smallest distance to the feature code of the image, and obtaining the target images that correspond to the feature code in the feature code library.

4. The image-to-image search method according to claim 3, wherein obtaining the feature code in the feature code library with the smallest distance to the feature code of the image to be searched includes:
  comparing the distance between the feature code of the image and each feature code in the feature code library with a distance threshold to obtain feature codes in the feature code library with distances less than the distance threshold; and
  sorting the feature codes in the feature code library with distances less than the distance threshold according to magnitudes of the distances to obtain the feature code in the feature code library with the smallest distance to the feature code of the image.

5. The image-to-image search method according to claim 1, wherein obtaining the multi-dimensional hash models through training includes:
  establishing a training data set, the training data set including an image subset and at least two tag subsets, the at least two tag subsets being in one-to-one correspondence with the at least two categories of similarity search, tags in each tag subset being obtained based on a category of similarity search that corresponds to the tag subset, the image subset including a plurality of images, and each tag subset including tags that are in one-to-one correspondence with images in the image subset; and
  obtaining the multi-dimensional hash models through training with the training data set.

6. The image-to-image search method according to claim 5, wherein obtaining the multi-dimensional hash models through training with the training data set includes:
  dividing the images in the image subset into a plurality of image pairs;
  for each image pair, determining whether tags corresponding to the image pair in each tag subset are the same or not, determining that the image pair is a positive sample if the tags corresponding to the image pair in each tag subset are the same, and determining that the image pair is a negative sample if the tags corresponding to the image pair are not the same; and
  inputting the positive sample and the negative sample to a convolutional neural network for training to obtain the multi-dimensional hash models.

7. The image-to-image search method according to claim 5, wherein
  in a case where any category of similarity search includes a plurality of sub-categories, a number of images in the image subset with features of respective subcategories under the category of similarity search is configured according to proportions of the sub-categories.

8. The image-to-image search method according to claim 1, further comprising:
  establishing a feature code library that uniquely corresponds to the at least one category of similarity search.

9. The image-to-image search method according to claim 8, wherein establishing the feature code library that uniquely corresponds to the at least one category of similarity search includes:
  inputting images in an image library to a trained hash model that uniquely corresponds to the at least one category of similarity search to obtain feature codes of the images; and
  obtaining the feature code library that uniquely corresponds to the at least one category of similarity search according to the obtained feature codes.

10. A non-transitory computer-readable storage medium having stored therein computer program instructions that, when executed on a processor, cause the processor to perform the image-to-image search method according to claim 1.

11. The computer-readable storage medium according to claim 10, the program instructions, when executed on a processor, further cause the processor to perform:
  receiving a push request sent by the terminal, the push request instructing to send an image that a user is interested into an image screen, and the image that the user is interested in being one or more of the target images; and
  sending the image that the user is interested into the image screen, so that the image screen displays the image that the user is interested in.

12. The computer-readable storage medium according to claim 10, wherein obtaining the target images that are similar to the image to be searched according to the feature code of the image in the feature code library that uniquely corresponds to the at least one category of similarity search includes:
  calculating a distance between the feature code of the image and each feature code in the feature code library according to the feature code of the image in the feature code library that uniquely corresponds to the at least one category of similarity search; and
  obtaining a feature code in the feature code library with a smallest distance to the feature code of the image, and obtaining the target images that correspond to the feature code in the feature code library.

13. The computer-readable storage medium according to claim 12, wherein obtaining the feature code in the feature code library with the smallest distance to the feature code of the image to be searched includes:
  comparing the distance between the feature code of the image and each feature code in the feature code library with a distance threshold to obtain feature codes in the feature code library with distances less than the distance threshold; and
  sorting the feature codes in the feature code library with distances less than the distance threshold according to magnitudes of the distances to obtain the feature code in the feature code library with the smallest distance to the feature code of the image.

14. A server, comprising:
  a memory storing one or more programs; and
  a processor, wherein when the one or more programs stored in the memory are executed by the processor, the image-to-image search method according to claim 1 are implemented.

15. The server according to claim 14, wherein when the one or more programs stored in the memory are executed by the processor, further steps are implemented:
  receiving a push request sent by the terminal, the push request instructing to send an image that a user is interested into an image screen, and the image that the user is interested in being one or more of the target images; and
  sending the image that the user is interested into the image screen, so that the image screen displays the image that the user is interested in.

16. The server according to claim 14, wherein obtaining the target images that are similar to the image to be searched according to the feature code of the image in the feature code library that uniquely corresponds to the at least one category of similarity search includes:
- calculating a distance between the feature code of the image and each feature code in the feature code library according to the feature code of the image in the feature code library that uniquely corresponds to the at least one category of similarity search; and
- obtaining a feature code in the feature code library with a smallest distance to the feature code of the image, and obtaining the target images that correspond to the feature code in the feature code library.

17. The server according to claim 16, wherein obtaining the feature code in the feature code library with the smallest distance to the feature code of the image to be searched includes:
- comparing the distance between the feature code of the image and each feature code in the feature code library with a distance threshold to obtain feature codes in the feature code library with distances less than the distance threshold; and
- sorting the feature codes in the feature code library with distances less than the distance threshold according to magnitudes of the distances to obtain the feature code in the feature code library with the smallest distance to the feature code of the image.

* * * * *